United States Patent [19]
Kato et al.

[11] Patent Number: 5,806,364
[45] Date of Patent: Sep. 15, 1998

[54] VIBRATION-TYPE ANGULAR VELOCITY DETECTOR HAVING SENSORLESS TEMPERATURE COMPENSATION

[75] Inventors: Kenzi Kato, Okazaki; Junichi Sato, Kariya, both of Japan

[73] Assignee: Denso Corporation, Kariya, Japan

[21] Appl. No.: 769,396

[22] Filed: Dec. 19, 1996

[30] Foreign Application Priority Data

Dec. 21, 1995 [JP] Japan .................................. 7-333559

[51] Int. Cl.$^6$ .................................................. G01P 9/00
[52] U.S. Cl. ........................... 73/504.12; 73/497; 310/315
[58] Field of Search ........................... 73/504.02, 504.03, 73/504.04, 504.12, 504.15, 504.16, 497; 310/315, 316, 317, 319

[56] References Cited

U.S. PATENT DOCUMENTS

| | | | |
|---|---|---|---|
| 5,131,273 | 7/1992 | Tabata et al. | 73/497 |
| 5,343,749 | 9/1994 | Macy | 73/504.16 |
| 5,355,730 | 10/1994 | Koizumi | 73/497 |
| 5,408,876 | 4/1995 | Macy | 73/504.16 |
| 5,430,342 | 7/1995 | Watson | 310/316 |
| 5,554,904 | 9/1996 | Terajima | 310/316 |
| 5,677,485 | 10/1997 | Nakamura | 73/497 |

FOREIGN PATENT DOCUMENTS

| | | |
|---|---|---|
| 5-264280 | 10/1993 | Japan . |
| 5-296771 | 11/1993 | Japan . |
| 6-147901 | 5/1994 | Japan . |
| 6-056300 | 7/1994 | Japan . |
| 7-218269 | 8/1995 | Japan . |

*Primary Examiner*—Hezron E. Williams
*Assistant Examiner*—Richard A. Moller
*Attorney, Agent, or Firm*—Cushman Darby & Cushman IP Group of Pillsbury Madison & Sutro

[57] ABSTRACT

A vibration-type angular velocity detector is for accurately correcting temperature-induced variations of an angular velocity signal without using a temperature sensor. A driving piezoelectric element, a detecting piezoelectric element and reference piezoelectric element are disposed on a vibration element. Using an output signal of the reference piezoelectric signal, a feedback control loop for applying driving voltage to the driving piezoelectric element is provided using an amplifier, a phase-shifting circuit, a rectifier, a reference voltage generator, a differential amplifier and a multiplier so as to vibrate the vibration element at a fixed amplitude. In addition, using an output signal of the detecting piezoelectric element at the time of vibrating the vibration element, an angular velocity signal is output. Here, the output voltage of the differential amplifier is a signal corresponding to the temperature of the vibration element. A correction signal is prepared by a correction signal preparing circuit using the differential amplifier output signal added to the angular velocity signal by a summer so that the temperature correction of the angular velocity signal is performed.

18 Claims, 5 Drawing Sheets

VIBRATION-TYPE ANGULAR VELOCITY DETECTOR HAVING SENSORLESS TEMPERATURE COMPENSATION

CROSS-REFERENCE TO RELATED APPLICATION

This application is based upon and claims the benefit of priority of the prior Japanese patent Application No. 7-333559 filed on Dec. 21, 1995, the contents of which are incorporated herein by reference.

BACKGROUND OF THE INVENTION

1. Field of the Invention

The present invention relates to a vibration-type angular velocity detector.

2. Description of Related Art

Generally, this kind of a vibration-type angular velocity detector is disclosed in Japanese Examined patent publication No. Hei 6-56300.

The structure of the detector is illustrated in FIGS. 5 and 6. FIG. 5 is a drawing of a vibration element of a vibration-type angular velocity detector, and FIG. 6 is its electric circuit diagram. As illustrated in FIG. 5, the vibration-type angular velocity detector includes a rectangular-parallelepiped metallic substrate 10, a metallic vibration element 20 and piezoelectric elements 30a, 30b, 40a, 40b, 50a and 50b.

Vibration element 20, structured as a tuning fork, includes a pair of diaphragms 21 and 22 consisting of rectangular flat plates and another pair of diaphragms 23 and 24 consisting of rectangular flat plates connected to diaphragms 21 and 22 at right angles. Diaphragms 21 and 22 are supported by a base 25 so that entire vibration element 20 is vibrated relative to base 25.

Driving piezoelectric elements 30a and 30b are fixedly mounted on diaphragms 21 and 22, while detecting piezoelectric elements 40a and 40b are fixedly mounted on diaphragms 23 and 24. When alternating voltage is applied to driving piezoelectric elements 30a and 30b, diaphragms 21 and 22 are vibrated side to side in the figure relative to base 25. At this time, when angular velocity ω is developed, due to the Coriolis force acting thereon, diaphragms 23 and 24 vibrate in a direction perpendicular to the paper surface.

Here, reference piezoelectric elements 50a and 50b are fixedly mounted on diaphragms 21 and 22 for outputting signals corresponding to the vibration of diaphragms 21 and 22.

As shown in FIG. 6, the output signals of reference piezoelectric elements 50a and 50b are amplified by an amplifier 70 and the amplified voltage is shifted by 90° at a phase-shifting circuit 80. The shifted voltage is applied to driving piezoelectric elements 30a and 30b via a multiplier 120. After receiving the phase-shifted voltage, driving piezoelectric elements 30a and 30b vibrate diaphragms 21 and 22 so that reference piezoelectric elements 50a and 50b output signals according to the vibration. Accordingly, by the aforementioned feedback loop, vibration element 20 self-oscillates at a mechanical resonance point thereof, an alternating current signal is applied to driving piezoelectric elements 30a and 30b, and diaphragms 21 and 22 are symmetrically vibrated. That is, vibration element 20 is vibrated as a tuning fork.

In addition, the output voltage of amplifier 70 is rectified by an rectifier 90 and is input into an inverting input terminal of a differential amplifier 110. On the other hand, from a reference voltage generating circuit 100, a reference voltage, set for symmetrically vibrating diaphragms 21 and 22 at a fixed amplitude, is input into a non-inverting input terminal of differential amplifier 110.

Differential amplifier 110 outputs the differential voltage between both input voltages to multiplier 120. After the 90°-shifted voltage and the differential voltage from differential amplifier 110 are multiplied at multiplier 120, the resulting voltage is output to driving piezoelectric elements 30a and 30b.

In the aforementioned structure, as the vibration of diaphragms 21 and 22 becomes greater, the output voltage of amplifier 70 becomes greater and the output voltage of rectifier 90 also becomes greater. As a result, the output voltage of differential amplifier 110 and the output voltage of multiplier 120 are decreased so that the vibration of diaphragms 21 and 22 is reduced. Likewise, when the vibration of diaphragms 21 and 22 decreases, the vibration of diaphragms 21 and 22 must be increased. Accordingly, feedback control is performed to fix the amplitude of output voltage of amplifier 70, thereby fixing the vibration amplitude of diaphragms 21 and 22.

Further, a signal according to angular velocity ω is output from detecting piezoelectric elements 40a and 40b. The output signal is synchronously detected by a synchronous detector 130, amplified by amplifier 150 via a low-pass filter circuit 140 and output as an angular velocity signal.

Here, reference piezoelectric elements 50a and 50b and detecting piezoelectric elements 40a and 40b have the same temperature characteristics, and each of amplifiers 60 and 70 has the same temperature characteristics. Accordingly, when the temperature of vibration element 20 is changed, the output signal of amplifier 60 is stabilized corresponding to the temperature change because the output signal of amplifier 70 is controlled for fixing the amplitude. Therefore, the fluctuation of the offset voltage (angular velocity signal when angular velocity ω is 0) due to the temperature change can be suppressed.

According to the structure, the fluctuation of the offset voltage due to the temperature change of vibration element 20 can be considerably suppressed. However, such suppression as above turns out to be insufficient since it is impossible to make each piezoelectric element and each amplifier completely equal in their temperature characteristics in the manufacturing process.

A device correcting the temperature of an angular velocity signal corresponding to the temperature change of a vibration element is disclosed in Japanese Laid-Open Patent Publication Nos. Hei 5-264280 and 5-296771. For such device having a temperature sensor in the vicinity of a vibration element, the temperature correction is performed by adding a DC voltage according to the temperature to the angular velocity signal.

However, even if the temperature sensor is provided in the vicinity of the vibration element, there is a difference in temperature between the vibration element and the temperature sensor; therefore, accurate temperature correction cannot be obtained.

SUMMARY OF THE INVENTION

In the light of the above-mentioned problem of the prior art, the present invention has an object of performing accurate temperature correction of an angular velocity signal without using a temperature sensor.

To accomplish the aforementioned object, use is made of the fact that output voltage of a differential amplifier 110 is a signal corresponding to the temperature of vibration element 20 according to the structure illustrated in FIGS. 5 and 6, so that temperature correction of an angular velocity signal may be performed using the amplifier output signal.

The above driving piezoelectric elements 30a and 30b and reference piezoelectric elements 50a and 50b have electromechanical coupling factors (including mechanoelectrical coupling factors) which include temperature characteristics. Hence, when the vibration amplitude of vibration element 20 is increased due to the temperature change, the alternating voltage of the amplified output of reference piezoelectric elements 50a and 50b by amplifier 70 is increased. Accordingly, the rectified output voltage of amplifier 70 is also increased and the output voltage of differential amplifier 110 subtracting the reference voltage from the rectified voltage is reduced. In addition, when the vibration amplitude of vibration element 20 is reduced due to the temperature change, a wholly opposite change in voltage occurs and the output voltage of differential amplifier 110 is increased.

Consequently, the temperature change of vibration element 20 can be found by analyzing the output voltage of differential amplifier 110. FIG. 7 shows the result of measuring the output voltage of differential amplifier 110 when the temperature of vibration element 20 is varied from −30° to 65° C. According to this Figure, the output voltage of differential amplifier 110 is substantially proportional to the temperature of vibration element 20.

On the basis of the above, according to a first aspect of the present invention, temperature of an angular velocity signal is corrected using the output signal of the reference piezoelectric element when driving voltage is output to the driving piezoelectric elements based on the output signal of reference piezoelectric element to vibrate the vibration element at a fixed amplitude.

Therefore, temperature correction of the angular velocity signal is accurately performed without using a temperature sensor.

According to a second aspect of the present invention, a feedback control unit including an amplifier for amplifying an output signal of a reference piezoelectric element, a rectifier for rectifying the amplified output and a differential amplifier for outputting differential voltage between the rectified voltage and reference voltage is provided. The temperature correction of angular velocity signal is performed by using the output of the differential amplifier.

When the output voltage of the differential amplifier is used in this way, a signal representative of the temperature of the vibration element can be readily obtained, thereby easily performing the temperature correction.

According to a third aspect of the present invention, correcting means for correcting the temperature can be implemented by a correction signal preparing circuit for forming a correction signal which offsets the fluctuation of the angular velocity signal due to the temperature change of the vibration element, and a summer for summing the correction signal and the angular velocity signal.

In this case, according to a fourth aspect of the present invention, the correction signal preparing circuit includes a correction direction signal output circuit for outputting a correction direction signal fluctuating in an opposite direction to the direction which the angular velocity signal fluctuates according to the temperature change, and a variable-gain amplifier for setting a gain of the output correction direction signal. Accordingly, a fluctuating direction and a size of the angular velocity signal can be individually adjusted at every unit.

Further, according to a fifth aspect of the present invention, the correction direction signal can be set by selecting any of a plurality of the correction direction signals prepared based on the output signal of the reference piezoelectric element.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

Several embodiments of the present invention will hereinafter be described with respect to the accompanying drawings.

Figure 1:
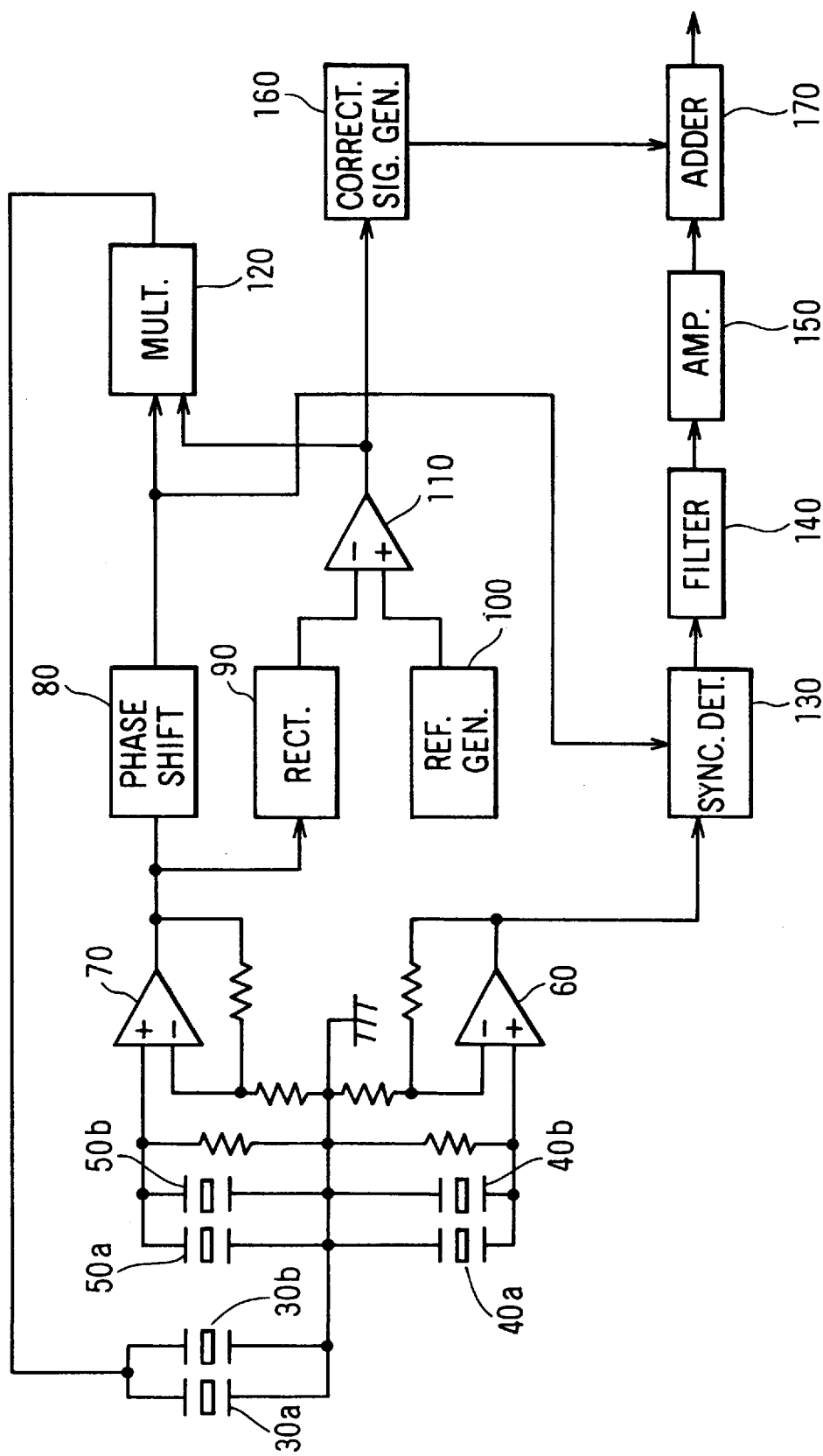
FIG. 1 is a schematic diagram of a preferred embodiment of the present invention.

An electric circuit structure of a vibration-type angular velocity detector according to a first embodiment is illustrated in FIG. 1. The structure is similar to the one shown in FIG. 6 except that a correction signal preparing circuit 160 and a summer 170 are added in the first embodiment of the present invention. In addition, the structure of a vibration element is as same as the structure in FIG. 5.

Figure 7:
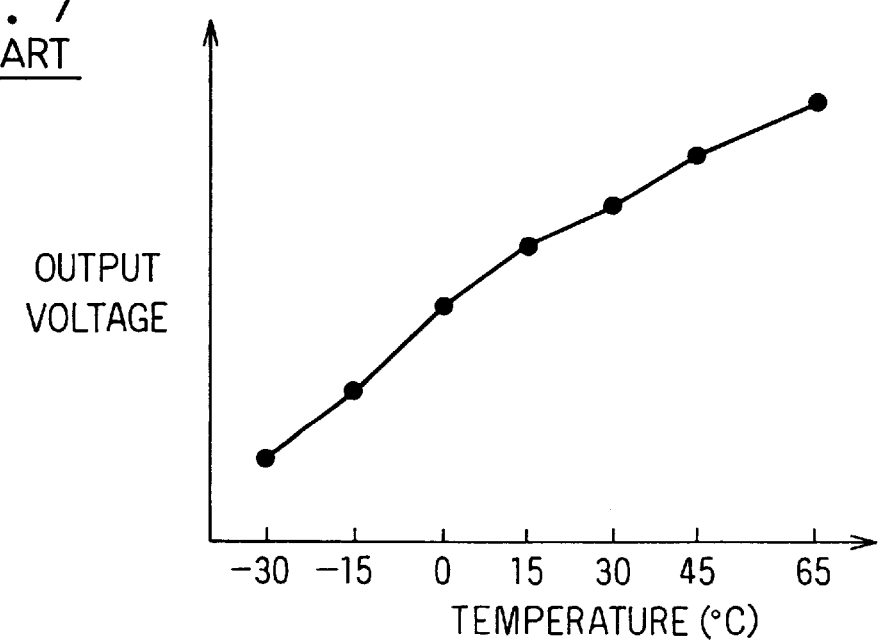
FIG. 7 is a graph of a relationship between temperature of the vibration element and output voltage of a differential amplifier.

Since the output voltage of the differential amplifier 110 is substantially proportional to the temperature of the vibration element 20 as illustrated in FIG. 7, correction signal preparing circuit 160 prepares a correction signal for temperature correction using the output voltage of differential amplifier 110. Summer 170 adds an angular velocity signal from an amplifier 150 to the correction signal from correction signal preparing circuit 160, and outputs a temperature-corrected angular velocity signal.

Figure 2A:
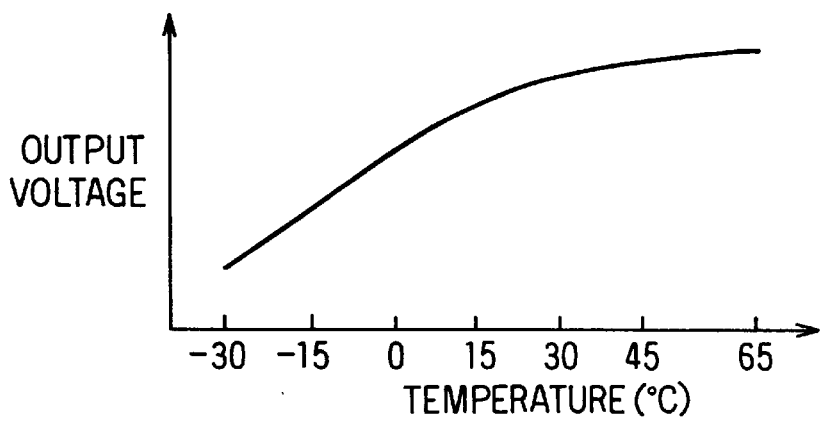
FIGS. 2A–2D are graphs of variation patterns of an angular velocity signal before temperature correction according to the embodiment.
Figure 2B:
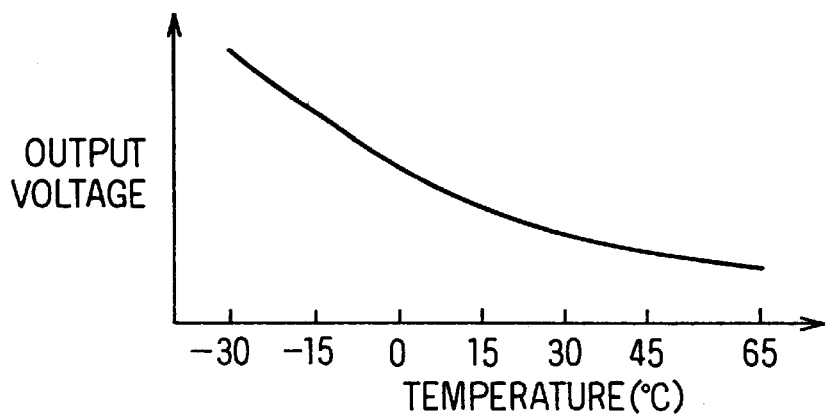
Figure 2C:
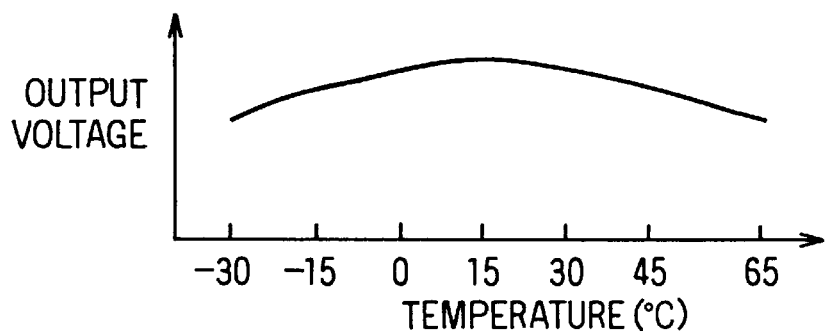
Figure 2D:
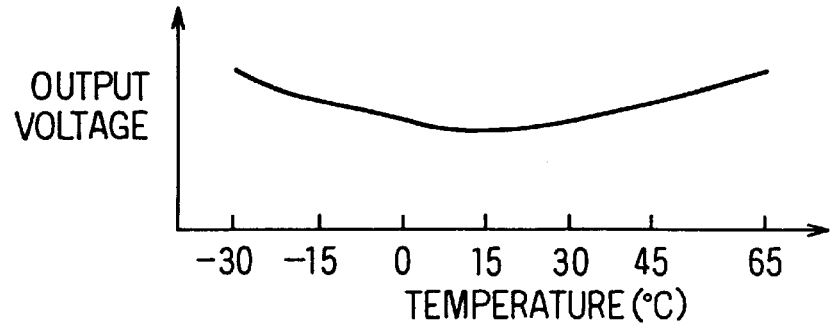

Here, when the angular velocity ω is 0 (i.e., the vibration element 20 is in a non-rotating state), the angular velocity output signal output from amplifier 150 is not monotonically changed according to the temperature change but changed in patterns as illustrated in FIGS. 2A through 2D. FIG. 2A is a pattern where the angular velocity signal is monotonically increased with respect to the temperature rise. FIG. 2B is a pattern where the angular velocity signal is monotonically decreased with respect to the temperature rise. FIGS. 2C and 2D are patterns where the angular velocity signals fluctuate with respect to the temperature rise.

Accordingly, correction signal preparing circuit 160 is formed in order to prepare correction signals corresponding to the respective patterns.

Figure 3:
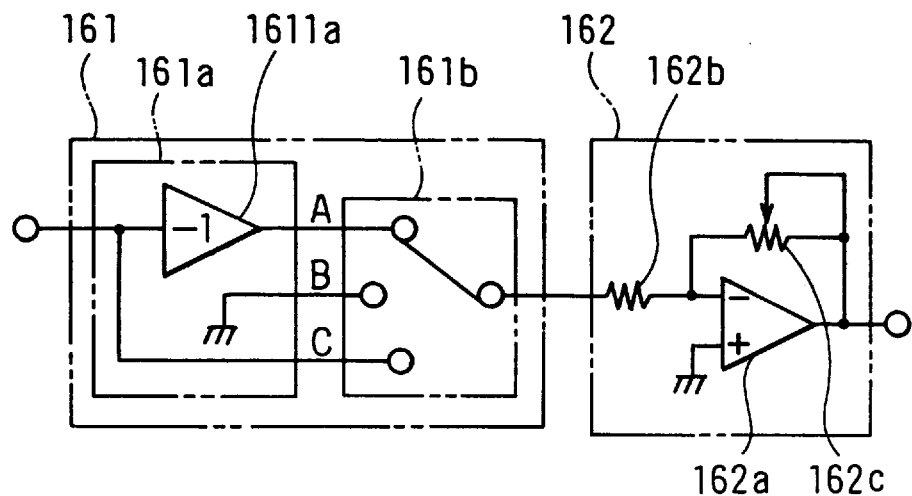
FIG. 3 is a schematic diagram of a detailed structure of a correction signal preparation circuit according to the embodiment.

FIG. 3 illustrates the structure of correction signal preparing circuit 160. Correction signal preparing circuit 160 includes a correction direction signal output circuit 161 for outputting a correction direction signal fluctuating in a direction opposite to the direction the angular velocity signal fluctuates relative to the temperature change of vibration element 20, and a variable-gain amplifier 162 for setting a gain of the output correction direction signal.

Correction direction signal 161 has a circuit 161a providing a plurality of correction direction signals having different fluctuation directions in relation to the temperature change of the vibration element by the output voltage of differential amplifier 110, and a switching circuit 161b for selecting an output of circuit 161a. That is, circuit 161a includes an inverting amplifier 1611a for outputting a signal A inverted and amplified by inverting amplifier 1611a, a signal B connected to GND and an output signal C of differential amplifier 110. Switching circuit 161b selects any one of these signals A through C.

The output of switching circuit 161b is input into variable-gain amplifier 162. Variable-gain amplifier 162 is made up of an operational amplifier 162a, a fixed resistor 162b and a variable resistor 162c so that the gain can be varied with respect to the input signal.

The above-mentioned selection of switching circuit 161b and gain setting of variable-gain amplifier 162 are performed as follows.

First, with signal B selected by switching circuit 161, the angular velocity signal is measured while varying the temperature of vibration element 20. When signal B is selected, since the correction signal output from correction signal preparing circuit 160 becomes 0, the angular velocity signal without any correction can be measured.

By this measurement, when the varying pattern of the angular velocity signal shows a monotonic increase as illustrated in FIG. 2A, signal C is selected by switching circuit 161b. The correction signal becomes a signal which monotonically declines with respect to the temperature change of vibration element 20 because the selected output signal C of differential amplifier 110 is inverted and amplified by variable-gain amplifier 162.

When the variation pattern of the angular velocity signal shows a monotonic decrease as illustrated in FIG. 2B, signal A is selected by switching circuit 161b. In this case, the correction signal becomes a signal which monotonically increases with respect to the temperature change of vibration element 20 because signal A having the output voltage of differential amplifier 110 inverted and amplified is further inverted and amplified by variable-gain inverting amplifier 162.

Further, along with the selection of switching circuit 161b, the resistance of a variable resistor 162c is adjusted according to a margin of variation of the measured angular velocity signal, and the gain of variable-gain inverting amplifier 162 is set.

By such selection and adjustment, the correction signal output from correction signal preparing circuit 160 becomes a signal monotonically declining with the same rate of change when the variation pattern is drawn as illustrated in FIG. 2A and becomes a signal monotonically increasing with the same rate of change when the variation pattern is drawn as illustrated in FIG. 2B.

Therefore, at the time of detecting the angular velocity, the temperature-corrected angular velocity signal can be output by summing the above-mentioned correction signal and the angular velocity signal from amplifier 150 at summer 170.

Figure 4:
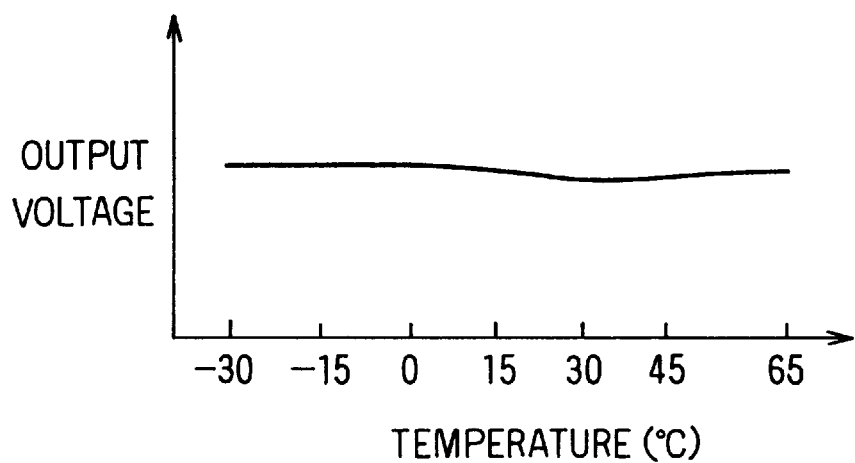
FIG. 4 is a graph of a variation pattern of the angular velocity signal after the temperature correction according to the embodiment.

FIG. 4 shows an example of a variation pattern of the temperature-corrected angular velocity signal. Apparent from this Figure, the fluctuation of the angular velocity signal is remarkably reduced relative to the temperature change.

Here, when the variation pattern of the angular velocity signal fluctuates as shown in FIGS. 2C and 2D, signal B is to be a selected signal without correction because the variation margin is relatively small. However, when the variation margin is large, the detector output is deemed to be unacceptable because the signal cannot be corrected at correction signal preparing circuit 160 in FIG. 3.

Although the present invention has been fully described in connection with the preferred embodiment thereof with reference to the accompanying drawings, it is to be noted that various changes and modifications will become apparent to those skilled in the art.

For example, according to the aforementioned embodiment of the present invention, the correction signal is prepared at the correction signal preparing circuit 160 based on the output voltage of differential amplifier 110, but it is possible to provide the output voltage of differential amplifier 110 to a microprocessor via an A/D converter and generate a correction amount using the calculations of the microprocessor so that the correction signal is output via a D/A converter.

Additionally, while the output voltage of differential amplifier 110 is used as an input signal for temperature correction according to the present embodiment, the rectified output voltage of multiplier 120 may be used. As for the feedback control circuit for fixing the amplitude of the output signal of amplifier 70, in addition to the above-mentioned signals, any signals using the temperature characteristic of reference piezoelectric elements 50a and 50b fixedly mounted on vibration element 20 may be used as an input signal for the temperature correction. Since the output voltage of differential amplifier 110 exhibits a wide voltage swing with respect to the temperature change, the output voltage of differential amplifier 110 is the most desirable for practical use.

For controlling a phase from amplifier 70, it is not necessary to use the above-described phase shifting circuit 80 and a PLL (phase locked loop) circuit which is illustrated in FIG. 3 of Japanese Laid-Open patent publication No. Hei 6-56300 may be used instead. That is, anything which applies alternating voltage having 90° phase difference between the output voltage of amplifier 70 and driving piezoelectric circuits 30a and 30b in accordance with the phase difference in a output signal between amplifier 70 and driving piezoelectric elements 30a and 30b may be used.

Figure 5:
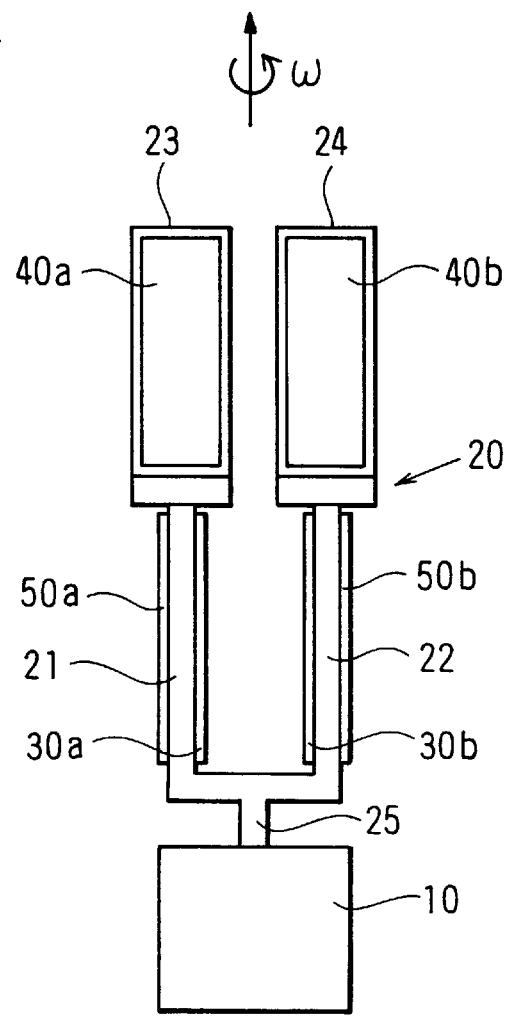
FIG. 5 is a drawing of a vibration element of an vibration-type angular velocity detector.
Figure 6:
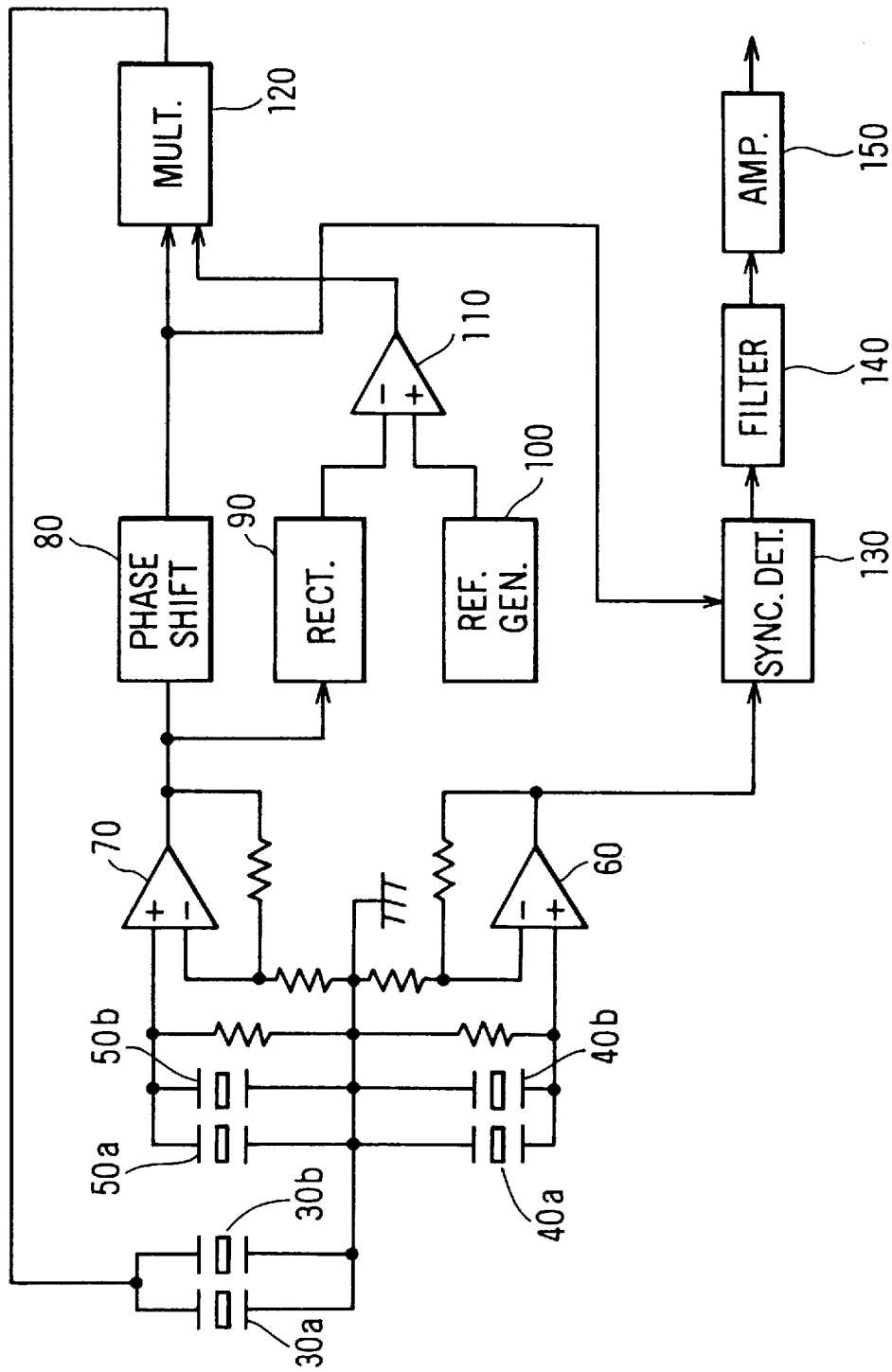
FIG. 6 is a schematic diagram of a conventional vibration-type angular velocity detector.

Furthermore, the structure of vibration element 20 may be one other than the one illustrated in FIG. 5. The point is, when the vibration element is vibrated by driving piezoelectric elements, a vibration component crossing the vibrating direction at a right angle is detected from the detecting piezoelectric element.

Such changes and modifications are to be understood as being included within the scope of the present invention as defined by the appended claims.

What is claimed is:

1. A vibration-type angular velocity detector comprising:
   a vibration element;
   a driving piezoelectric element for vibrating said vibration element;

a detecting piezoelectric element for outputting a signal corresponding to a vibration component crossing at a right angle t a vibrating direction of said vibration element when said vibration element is vibrated by said driving piezoelectric element;

a reference piezoelectric element for outputting a signal corresponding to said vibrating direction of said vibration element;

angular velocity signal output means for outputting an angular velocity signal based on an output signal of said detecting piezoelectric element;

feedback control means for outputting a driving voltage to said driving piezoelectric element in order to vibrate said vibration element at a fixed amplitude based on an output signal of said reference piezoelectric element; and correction means, connected between said angular velocity signal output means and said feedback control means, for temperature-correcting said output angular velocity signal based on said output signal of said reference piezoelectric element.

2. A vibration-type angular velocity detector according to claim 1, wherein:

said feedback control means includes an amplifier for amplifying said output signal of said reference element, a rectifier for rectifying an output voltage of said amplifier and a differential amplifier for outputting a differential voltage between the rectified voltage and the reference voltage; and said correction means is for temperature-correcting said angular velocity signal using said differential voltage.

3. A vibration-type angular velocity detector according to claim 2, wherein said correction means includes a correction signal preparing circuit for preparing a correction signal for offsetting fluctuation of said angular velocity signal due to temperature change of said vibration element, and a summer for summing said correction signal with said angular velocity signal.

4. A vibration-type angular velocity detector according to claim 3, wherein said correction signal preparing circuit includes a correction direction signal output circuit for outputting a correction direction signal which fluctuates in a direction opposite to a direction in which said angular velocity signal fluctuates with respect to said temperature change of said vibration element, and a variable-gain amplifier for setting a gain of said output correction direction signal.

5. A vibration-type angular velocity detector according to claim 4, wherein said correction direction signal output circuit includes a circuit for preparing a plurality of correction direction signals having different fluctuation directions with respect to said temperature change of said vibration element based on said output signal of said reference element, and a circuit for selecting one of said plurality of correction direction signals as said correction detection signal.

6. A vibration-type angular velocity detector according to claim 1, wherein said correction means includes a correction signal preparing circuit for preparing a correction signal for offsetting fluctuation of said angular velocity signal due to temperature change of said vibration element, and a summer for summing said correction signal with said angular velocity signal.

7. A vibration-type angular velocity detector according to claim 6, wherein said correction signal preparing circuit includes a correction direction signal output circuit for outputting a correction direction signal which fluctuates in a direction opposite to a direction in which said angular velocity signal fluctuates with respect to said temperature change of said vibration element, and a variable-gain amplifier for setting a gain of said output correction direction signal.

8. A vibration-type angular velocity detector according to claim 7, wherein said correction direction signal output circuit includes a circuit for preparing a plurality of correction direction signals having different fluctuation directions with respect to said temperature change of said vibration element based on said output signal of said reference element, and a circuit for selecting one of said plurality of correction direction signals as said correction detection signal.

9. An angular velocity detector comprising:

a vibration element;

a driving element contacting said vibration element to impart vibrational force to said vibration element;

a reference element contacting said vibration element for generating a first signal representative of a first vibration component of said vibration element corresponding to said vibrational force;

a detecting element contacting said vibration element for generating a second signal representative of a second vibration component of said vibration element corresponding to a rotational component of said vibration element;

feedback control means for, responsive to said first signal, driving said driving element at a given amplitude;

angular velocity signal generating means for generating an angular velocity signal representative of angular velocity of said vibration element responsive to said second signal; and temperature compensation means connected between said angular velocity signal generating means and said feedback control means, for correcting said angular velocity signal responsive to said first signal to compensate for temperature-induced variations in said angular velocity signal.

10. An angular velocity detector according to claim 9, wherein:

said feedback control means includes an amplifier for amplifying said output signal of said reference element, a rectifier for rectifying an output voltage of said amplifier and a differential amplifier for outputting a differential voltage between the rectified voltage and the reference voltage; and said temperature compensation means is for temperature-compensating said angular velocity signal using said differential voltage.

11. An angular velocity detector according to claim 10, wherein said temperature compensation means includes a correction signal preparing circuit for preparing a correction signal for offsetting fluctuation of said angular velocity signal due to temperature change of said vibration element, and a summer for summing said correction signal with said angular velocity signal.

12. An angular velocity detector according to claim 11, wherein said correction signal preparing circuit includes a correction direction signal output circuit for outputting a correction direction signal which fluctuates in a direction opposite to a direction in which said angular velocity signal fluctuates with respect to said temperature change of said vibration element, and a variable-gain amplifier for setting a gain of said output correction direction signal.

13. An angular velocity detector according to claim 12, wherein said correction direction signal output circuit includes a circuit for preparing a plurality of correction direction signals having different fluctuation directions with respect to said temperature change of said vibration element based on said output signal of said reference element, and a circuit for selecting one of said plurality of correction direction signals as said correction detection signal.

14. An angular velocity detector according to claim 9, wherein said temperature compensation means includes a correction signal preparing circuit for preparing a correction signal for offsetting fluctuation of said angular velocity signal due to temperature change of said vibration element, and a summer for summing said correction signal with said angular velocity signal.

15. An angular velocity detector according to claim 14, wherein said correction signal preparing circuit includes a correction direction signal output circuit for outputting a correction direction signal which fluctuates in a direction opposite to a direction in which said angular velocity signal fluctuates with respect to said temperature change of said vibration element, and a variable-gain amplifier for setting a gain of said output correction direction signal.

16. An angular velocity detector according to claim 15, wherein said correction direction signal output circuit includes a circuit for preparing a plurality of correction direction signals having different fluctuation directions with respect to said temperature change of said vibration element based on said output signal of said reference element, and a circuit for selecting one of said plurality of correction direction signals as said correction detection signal.

17. A vibration-type angular velocity detector comprising:

a vibration element;

a driving piezoelectric element for vibrating said vibration element;

a detecting piezoelectric element for outputting a signal corresponding to a vibration component crossing at a right angle t a vibrating direction of said vibration element when said vibration element is vibrated by said driving piezoelectric element;

a reference piezoelectric element for outputting a signal corresponding to said vibrating direction of said vibration element;

angular velocity signal output means for outputting an angular velocity signal based on an output signal of said detecting piezoelectric element;

feedback control means for outputting a driving voltage to said driving piezoelectric element in order to vibrate said vibration element at a fixed amplitude based on an output signal of said reference piezoelectric element; and correction means for temperature-correcting said output angular velocity signal based on said output signal of said reference piezoelectric element using a correction detection signal selected from a plurality of signals having different fluctuation directions with respect to said temperature change of said vibration element.

18. An angular velocity detector comprising:

a vibration element;

a driving element contacting said vibration element to impart vibrational force to said vibration element;

a reference element contacting said vibration element for generating a first signal representative of a first vibration component of said vibration element corresponding to said vibrational force;

a detecting element contacting said vibration element for generating a second signal representative of a second vibration component of said vibration element corresponding to a rotational component of said vibration element;

feedback control means for, responsive to said first signal, driving said driving element at a given amplitude;

angular velocity signal generating means for generating an angular velocity signal representative of angular velocity of said vibration element responsive to said second signal; and temperature compensation means for correcting said angular velocity signal responsive to said first signal to compensate for temperature-induced variations in said angular velocity signal using a correction detection signal selected from a plurality of signals having different fluctuation directions with respect to said temperature change of said vibration element.

* * * * *